Aug. 2, 1949.   R. C. PETERSEN   2,477,893
STILT
Filed Nov. 19, 1946
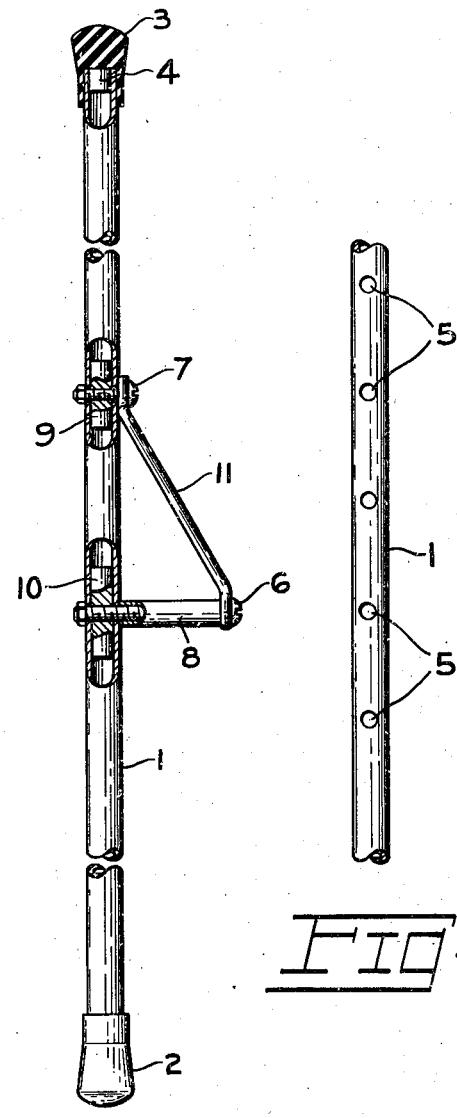
INVENTOR.
R. C. Petersen
BY
Merrill M. Blackburn.
Atty.

Patented Aug. 2, 1949

2,477,893

UNITED STATES PATENT OFFICE 2,477,893

STILT

Reynold C. Petersen, De Witt, Iowa

Application November 19, 1946, Serial No. 710,734

1 Claim. (Cl. 272—70.1)

My present invention relates to an improved construction of stilts and comprises among its objects the provision of a stilt which is so fabricated that it is light in weight and yet able to withstand all of the strains of ordinary use; the provision of a stilt the step of which is easily adjusted vertically to get the same any desired height from the ground; the provision of reinforcements for the transversely apertured parts thereof so that the weakest part of the stilt will be strengthened sufficiently to avoid breakage during use; the provision of a stilt which is inexpensive to manufacture and can be sold at a reasonable price; the provision of a stilt which is shod at its ends with rubber or the like to prevent it from slipping during use and to avoid marring woodwork; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interrupted in a limiting sense.

In the drawings annexed hereto and forming a part hereof,

Fig. 1 is an elevation of a stilt embodying my present invention; and

Fig. 2 is an elevation of the structure shown in Fig. 1, rotated ninety degrees (90°) about a vertical axis to show the holes for vertical adjustment of the step and its brace.

Reference will now be made in greater detail to the annexed drawings for a more complete description of this invention. The body 1 of the stilt is preferably made of light weight tubular metal and provided at its two ends with rubber caps 2 and 3. The ends of the tubular member may be closed by a suitable plug 4 which will reduce the amount of cutting of the caps by the metal tube during use. The body member 1 is provided with a plurality of bolt holes 5 for the reception of bolts 6 and 7 which support and brace the step 8. Blocks 9 and 10 are fitted in the body member 1, these blocks being provided with holes which are made to align with the holes 5 so that the bolts 6 and 7 may be passed therethrough. These blocks serve to reinforce the tubular member 1 at the points where the greatest strain occurs, due to weakening of the pipe.

As shown clearly in Fig. 1, the brace 11 connects the outer end of the bolt 6 to the bolt 7 where it enters the body 1. Also, as shown in Fig. 1, the bolt 6 is surrounded by a tubular member to constitute the step 8. This tubular member may be of any suitable material, such as metal, wood, rubber, or the like. It is clear that, in adjusting the step 8, the blocks 9 and 10 must be adjusted longitudinally within the pipe 1 so that the bolts 6 and 7 will pass therethrough.

It is of course understood that the specific description of structure set forth above may be departed from without departing from the spirit of this invention as disclosed in this specification and as defined by the appended claim.

Having now described my invention, I claim:

A stilt comprising an elongated, substantially cylindrical, light weight, tubular member having transverse holes therein for the reception of elongated connecting means, reinforcing blocks fitting slidably in the tubular member for rendering it less liable to bending during use, one of the elongated connecting means passing through one of said blocks, a step projecting laterally from the tubular member and having said one of the elongated connecting means passed therethrough and through the tubular member to hold them together, a brace connecting the outer end of the step to the tubular member, and a second one of said elongated connecting means passing through the second end of said brace, through a second block, and through the tubular member.

REYNOLD C. PETERSEN.

REFERENCES CITED

The following references are of record in the file of this patent:

UNITED STATES PATENTS

| Number | Name | Date |
| --- | --- | --- |
| 704,658 | McDonough | July 5, 1902 |
| 1,037,503 | Mann | Sept. 3, 1912 |
| 2,172,645 | Taylor | Sept. 12, 1939 |